(12) United States Patent
McCleave

(10) Patent No.: US 8,678,403 B1
(45) Date of Patent: Mar. 25, 2014

(54) X STAND KEYBOARD DOLLY

(71) Applicant: Bruce Poston McCleave, Los Angeles, CA (US)

(72) Inventor: Bruce Poston McCleave, Los Angeles, CA (US)

( * ) Notice: Subject to any disclaimer, the term of this patent is extended or adjusted under 35 U.S.C. 154(b) by 0 days.

(21) Appl. No.: 13/694,174

(22) Filed: Nov. 3, 2012

Related U.S. Application Data

(63) Continuation-in-part of application No. 12/656,199, filed on Jan. 19, 2010, now abandoned.

(51) Int. Cl.
*B62B 1/00* (2006.01)

(52) U.S. Cl.
USPC ............. 280/35; 280/79.11; 248/129; 84/453

(58) Field of Classification Search
USPC .................. 280/491.1, 35, 47.17, 79.11, 638, 280/47.34; 248/129; 84/190, 453
See application file for complete search history.

(56) References Cited

U.S. PATENT DOCUMENTS

| | | | | | |
|---|---|---|---|---|---|
| 1,322,719 | A | * | 11/1919 | Nelson | 280/35 |
| 1,350,963 | A | * | 8/1920 | Fowler | 248/172 |
| 1,853,318 | A | * | 4/1932 | Peters | 280/35 |
| 2,003,162 | A | * | 5/1935 | Ulmer | 280/35 |
| 2,534,367 | A | * | 12/1950 | Perrotta et al. | 280/35 |
| 2,683,610 | A | * | 7/1954 | Brown | 280/35 |
| 4,166,638 | A | * | 9/1979 | De Prado | 280/638 |
| 5,387,074 | A | * | 2/1995 | Brown | 414/589 |
| 5,726,368 | A | * | 3/1998 | Shaw | 84/190 |
| 5,938,217 | A | * | 8/1999 | Wintz | 280/79.11 |
| 6,752,379 | B1 | * | 6/2004 | Wall | 254/7 R |
| 6,966,574 | B1 | * | 11/2005 | Dahl | 280/651 |
| 7,055,847 | B2 | * | 6/2006 | Miller et al. | 280/638 |
| 7,287,766 | B2 | * | 10/2007 | Kilday et al. | 280/79.11 |
| 7,988,161 | B2 | * | 8/2011 | Kilday | 280/79.11 |
| 2008/0129003 | A1 | * | 6/2008 | Stengel et al. | 280/47.19 |
| 2009/0184217 | A1 | * | 7/2009 | Sprout | 248/124.1 |

\* cited by examiner

*Primary Examiner* — Bradley Duckworth

(57) ABSTRACT

One embodiment of a small dolly structure containing separate and individual main support beams. Connected to the main support beams are wheels and brakes. A multi configurational and adjustable center beams section that when connected to the main support beams allows the main support beams to be reconfigured to many positions. The main support beams are made of a rigid material in a u channel shape and have wheels attached to the back side of the u channel. The u channel of the main support beam is used facing upward to accommodate the feet or base of proposed loads or attachments. Attached to the main support beams are clamping mechanisms for holding loads in place. The clamping mechanism may be repositioned along the main support beam or removed to accommodate various loads. There are holes, slots and notches in the main support beams and link frame assemblies for attaching accessories. Other embodiments are described and shown.

5 Claims, 16 Drawing Sheets

X STAND KEYBOARD DOLLY

CROSS-REFERENCE TO RELATED APPLICATIONS

This application is a substitute specification of the non-provisional U.S. patent application Ser. No. 13/694,174 filed Nov. 3, 2012.

FEDERALLY SPONSORED RESEARCH

None

SEQUENCE LISTING

None

BACKGROUND

This relates to dollies, specifically a dolly that supports a type of keyboard stand commonly referred to in the music and entertainment business as an "X stand". A production item that may be used in the music and entertainment business is commonly referred to as a musical staging backline item. An "X stand" type keyboard stand is a musical staging backline item. The dolly I will be discussing below is an adjustable dolly structure designed to add mobility to a single or double tiered X stand type keyboard stand or other types of musical staging backline loads or accessories or a combination thereof. Musical Staging is the part of the Music Business that involves many key dynamics of moving and placing of the physical items being used at any given time on a stage or any related setting that utilizes musical gear. Being a long time veteran and production manager in the Music and Entertainment Business, it has become very clear that there is much room for improvements and development of gear throughout the Music Industry. This can become a very important component as it is often directly related to the bottom line or overall cost of doing business on a production that depends on handling, moving, and or repositioning of larger musical related items. I have been involved in many productions where many larger items such as complete keyboard setups, guitar amps, bass amps, etc, were needed to be moved quickly and repositioned on or off a stage or elsewhere. It became obvious that lack of mobility and other factors can easily cause problems, slow things down, or otherwise cause problematic issues to those involved.

The need for this kind of dolly becomes very obvious when we think about a major television award show such as "The Grammy Award Show" where producers have, for example, two hours real time to put many acts on and off a stage quickly. This could easily be a situation where producers need to move, for example, seven large live bands and eight smaller DJ-Front man type acts on and off a stage in real time for a national television show. This kind of show costs many thousands of dollars per minute to produce and we can now see where it becomes very important to execute a high paced choreography and ballet of moving around many major pieces of musical related items quickly and safely. This is why my new dolly design would be a benefit to producers, musicians, technicians, and others throughout the music and entertainment business. There are many potential new benefits for the musician user of this dolly design and backline setup including a user having a new freedom of mobility over previously used stationary backline setups, and potentially inspiring more creativity and new ideas on how to utilize a mobile keyboard setup or other appropriate backline setup or load. There is a constant need to keep up with developments in technology within the music and entertainment industry. This is why I have designed this new keyboard dolly. This dolly structure is specifically designed to improve many aspects of working with a single or double tiered X stand type keyboard stand or other loads including other types of musical staging backline with or without accessories. This dolly will decrease the amount of time and effort involved when moving a keyboard setup or other load that utilizes this musical staging backline and dolly combination. Situations as mentioned above make it very apparent why this new dolly design is needed for keyboard players, various types of musicians, producers, technicians, and other users that may utilize the single or double tiered X stand type keyboard stand or other loads including other types of musical staging backline with or without accessories.

Both U.S. Pat. No. D289,952 to Rokkomann (1987) and U.S. Pat. No. D4,763,865 to Danner (1988) show a keyboard stand representing what is commonly referred to as an "X stand" type keyboard stand throughout the music industry. This type of keyboard stand has been very popular since it was introduced to the market over twenty years ago. This keyboard stand, even though very popular, has limitations. One major limitation of the X stand is once this type of keyboard stand is loaded with keyboards or other accessories—it has to stay where it is. The keyboard stand and setup cannot be moved easily. If a move is required it would most likely involve disassembling the keyboard setup significantly to facilitate the move. To move this complicated setup once it has been put together can be very problematic and time consuming. It could easily involve un-patching many cables and removing the keyboard items to make the move possible. This new dolly is designed to eliminate this kind of hassle and add a new means of mobility to the average single or double tiered X stand type keyboard stand or other loads including other types of musical staging backline with or without accessories. Making this kind of keyboard stand or other backline item a mobile item adds new functionality, style, mode of operation, and other potential positive benefits to the keyboard stand's or other backline item's usefulness. The dolly structure is designed to handle many brands and designs of the popular X stand series of keyboard stands, but can also easily accommodate other types of musical staging backline items, and other loads. This popular type of keyboard stand is currently sold by companies such as Proline—Thousand Oaks, Calif.—www.prolinestands.com, and On-Stage Stands—Berlin, Conn.—www.onstagestands.com and many others. The X stand type of keyboard stand and many other backline items are used every day in situations that can easily benefit from using this new dolly design. This new dolly design will spur new ideas for the user helping them use their complete keyboard setup or other type backline setup more creatively.

In conclusion, insofar as I am aware, no dolly structure formerly developed provides a unique platform to securely attach and carry a loaded single or double tiered X stand type keyboard stand or other loads including other types of musical staging backline with or without accessories, and thus provide quick and easy maneuverability for the user and the complete desired musical staging backline setup.

SUMMARY

An improved use of a popular type of keyboard stand or other types of musical staging backline with or without accessories by incorporating a unique dolly structure that has design features specifically tailored to holding, supporting, and carrying a complete "X stand" type keyboard stand setup or other musical staging backline loads—thus allowing easy multi-directional mobility of the entire backline setup while keeping the setup significantly more intact—and thus a significant improvement over what would be the case of immobility of the entire backline setup without such a dolly structure. The dolly is designed to install and uninstall quickly and easily to a single or double tiered X stand type keyboard stand or other loads including other types of musical staging backline with or without accessories that fit within the dolly load and size capacity specifications. This dolly design adds a new means of mobility and other advantages to what would otherwise be an immobile and stationary X stand type keyboard set or other stationary type musical staging setup. The dolly also has design features that provide a means for adjustment to accommodate any height angle the X stand is designed to handle. Used properly the dolly can support the manufacturer's full load capacity for the single or double tiered X stand type keyboard stand or other loads including other types of musical staging backline with or without accessories while providing a means of mobility—with lockdown capability at a desired location. This dolly design can be used with many single tiered or double tiered, light duty, and heavy duty type X stand keyboard stands and other loads. Some single or double tiered X stand type keyboard stands or other loads including other types of musical staging backline with or without accessories may not fit the dolly structure correctly and are not recommended to be used with this dolly. This dolly can be used in many configurations by adding different kinds of linking frames to the main support beams. There are holes, slots and notches that allow the frames to be linked and accessories to be added. The lifting and lowering mechanism is mechanical in this embodiment. However, it can be hydraulic or pneumatic as well. The main support beams and optional accessories can be used with drum rack hardware to create a mobile structure for percussions and drums. There is a locking pin or mechanism to hold the link frames and main support beams together.

This new approach to an X stand type keyboard stand setup or other type musical staging backline setup will add a new functionality and—with the added ability to easily move or reposition the X stand type keyboard stand's footprint as needed. This adds value, style and new practicality for the user that utilizes this new dolly design in a backline setup. This will be an invaluable improvement for stage technicians, musicians, and producers who often utilize the single or double tiered X stand type keyboard stand or other loads including other types of musical staging backline with or without accessories for their musical staging needs. Many advantages of my new dolly design will become apparent from a study of the following description and the accompanying drawings.

DRAWINGS

DETAILED DESCRIPTION

Figure 1:
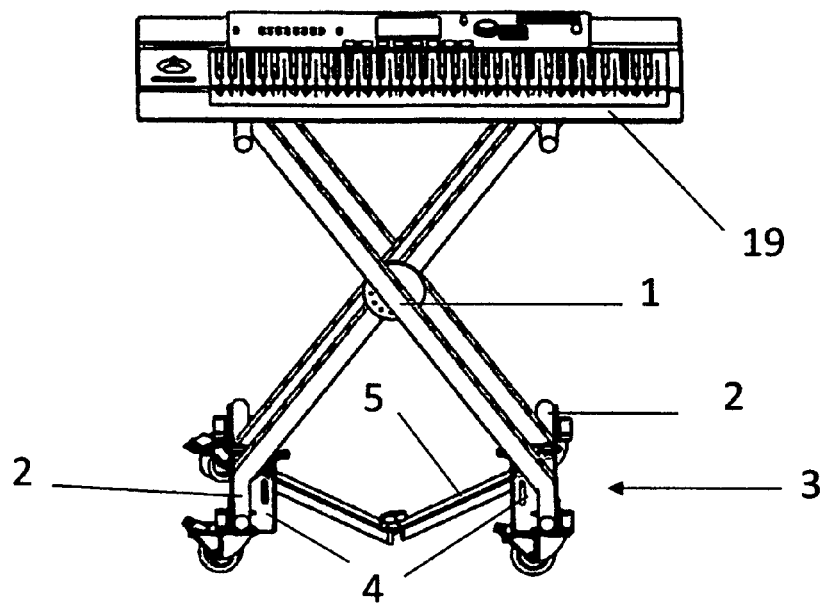
FIG. 1 is a drawing representing the front view of a loaded X stand attached to an X stand keyboard dolly.

FIG. 1 is a front view representing a complete keyboard setup. This FIG. shows a load 19 on top of an X stand 1 that is attached to an assembled X stand keyboard dolly 3. The foot rails 2 of the X stand are held in position on the support beams 4 of the dolly structure. There is an adjustable beam section 5 operably coupling the two support beams together—adding further stability to the dolly structure.

Figure 2:
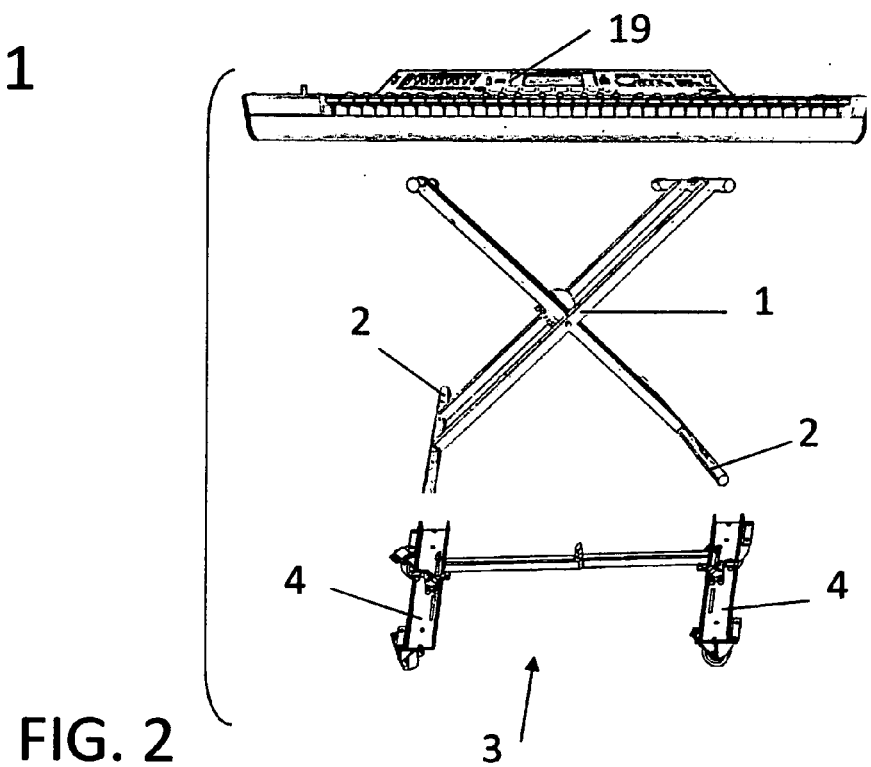
FIG. 2 is a drawing representing an exploded front view of a keyboard setup showing how the load and X stand are situated on the X stand dolly.

FIG. 2 is an exploded view of a complete keyboard setup showing how the keyboard load 19 and the X stand 1 are positioned on top of the X stand dolly 3. The X stand foot rails 2 align and drop into place on the dolly support beams 4 and are then locked into place.

Figure 3:
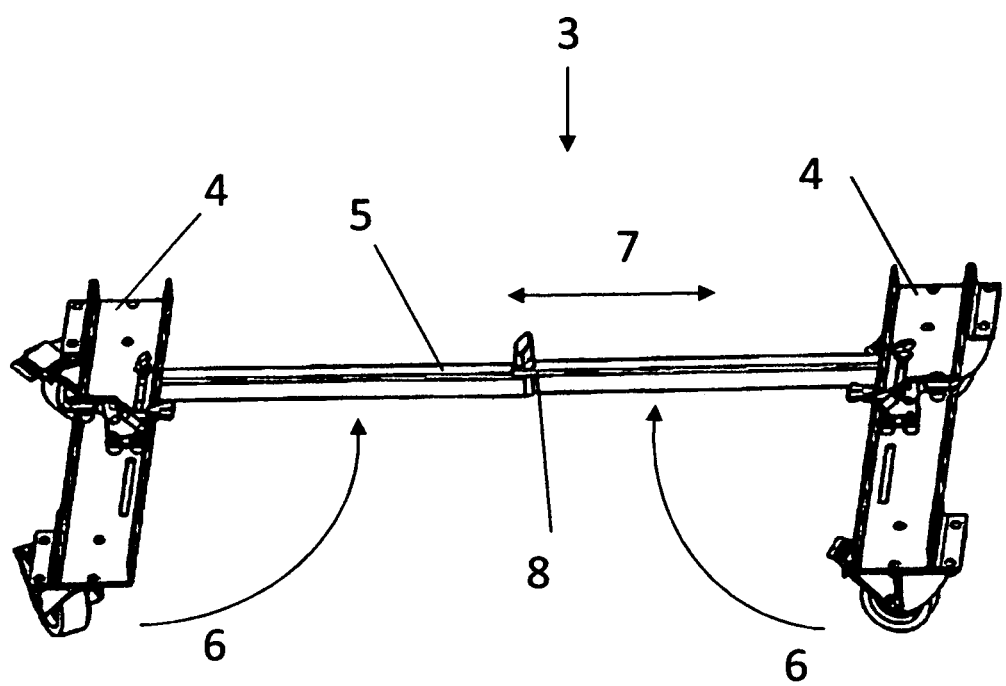
FIG. 3 is a front view drawing from the top representing a single X stand dolly without any keyboard stand attached.

FIG. 3 is a top view from the front representing the X stand dolly. The adjustable beam section 5 has a telescoping design 7 with a clinching mechanism 8 to hold the adjustment. The adjustable beam section in this embodiment is also pivotable 6 and pivots from the support beams 4 operably joining two halves of said dolly together at the center. This allows for lateral adjustment and further stability to the support beam structure. The dolly, as embodied in this example drawing, has a multiple piece structure that assembles into a one piece structure—and installs or uninstalls to an empty X stand or other appropriate load quickly and easily. The dolly structure is now ready for the user to load an X stand type keyboard stand or other loads.

Figure 4:
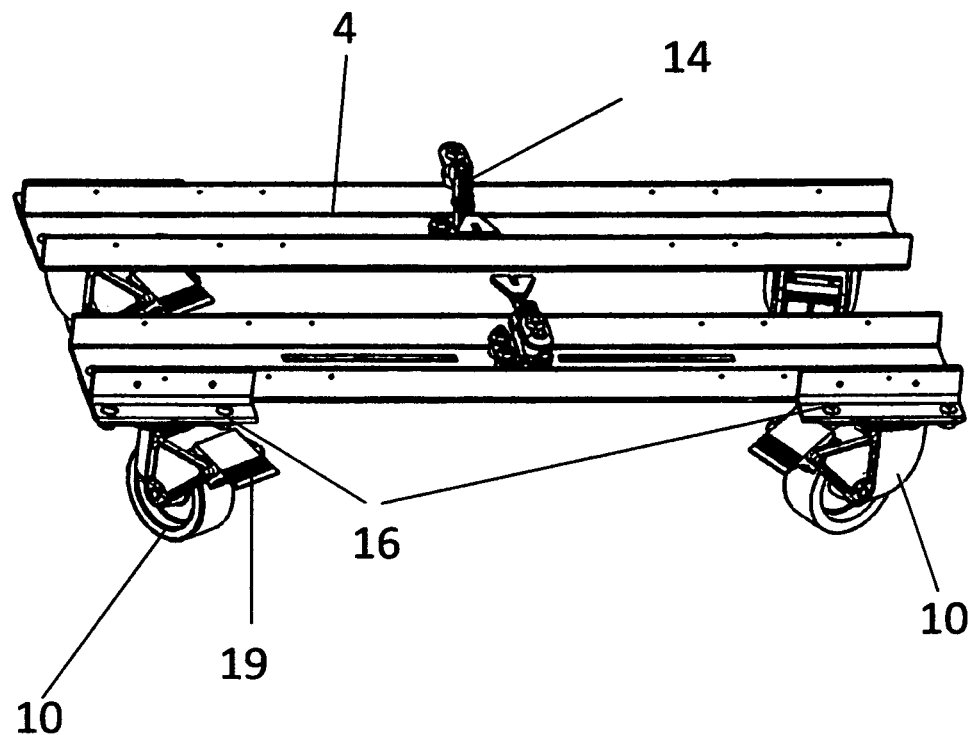
FIG. 4 is a drawing representing the side view of an X stand keyboard dolly separated into two pieces.

FIG. 4 is a side view representing one X stand keyboard dolly structure separated into two dolly support beam 4 sections positioned side by side. The two support beams comprising of aluminum channel, or other appropriate material substantial enough to handle the load, that are cut to an equal length large enough to support the length and width of the average X stand type keyboard stand foot rail or the foot piece of a typical drum rack. Installed near the center of each support beam is a clamping mechanism 14 that is used to hold the X stand keyboard stand or other load in place on the support beam structure. There are two swiveling, locking, rubberized, heavy duty wheels 10 attached to each of the support beams by means of a bolt and nut assembly 16 or other permanent attachment application in this embodiment. There are four wheels total in this embodiment. The wheel braking lever is in the locked 17 position on all four wheels in this drawing.

Figure 5:
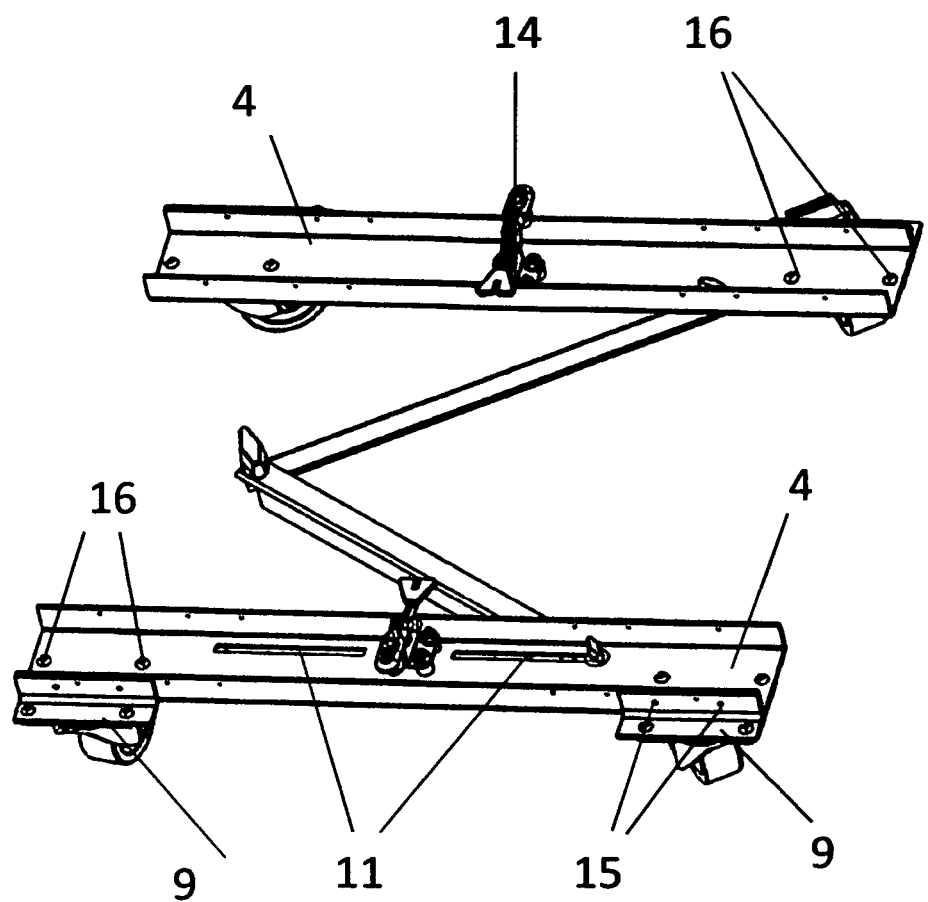
FIG. 5 is a drawing representing the top view including one adjustable beam section made up of two smaller beams of an X stand keyboard dolly.

FIG. 5 is a top view representing one side of the X stand keyboard dolly support beam 4 showing two wheels 10 attached to the support beam by means of bolts and nuts 16, or other permanent means. The wheel support brackets 9 are attached to the ends of the support beam by rivets 15, or other permanent means. The wheel support brackets comprising of left over aluminum channel, or other appropriate material, and are attached to the outside ends of each of the two support beams. This makes a total of four wheel support brackets for this embodiment. The dolly support beam has slots 11 for the positioning of the adjustable beam section or other accessories enabling alignment to accommodate many various X stand dolly configurations.

Figure 6:
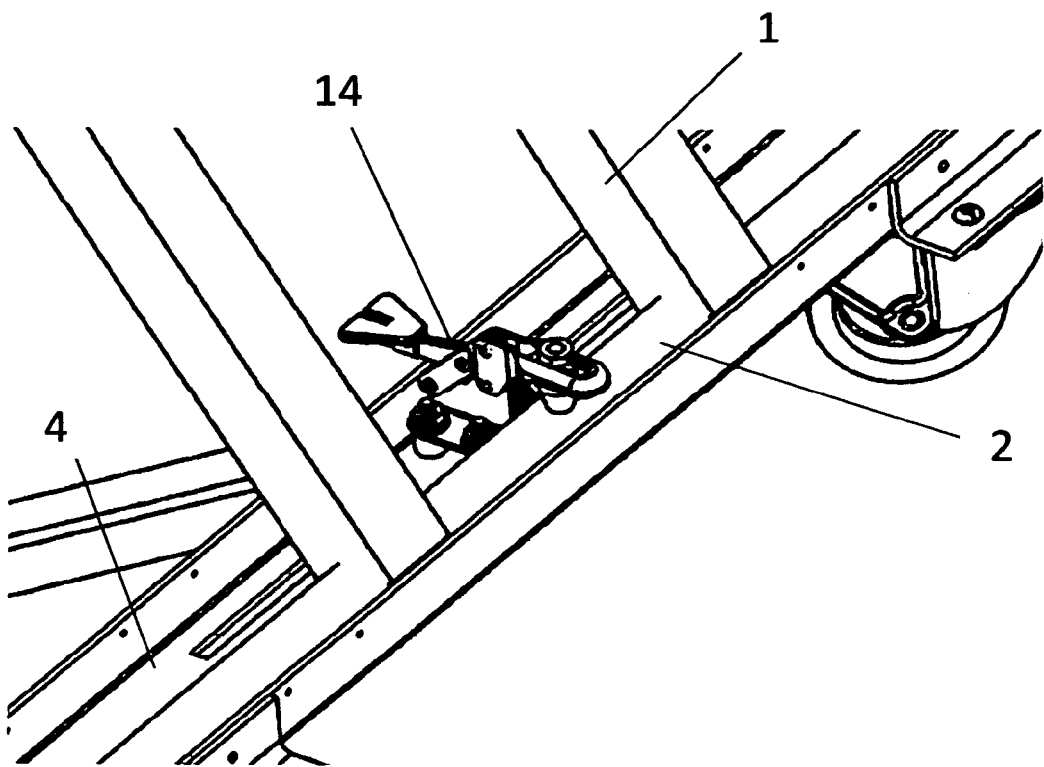
FIG. 6 is a drawing representing a clamping mechanism on one side of the X stand dolly support beam showing the clamping mechanism holding an X stand foot rail in place.

FIG. 6 is a close up drawing representing a clamping mechanism 14 coupled to support beam 4 showing a clamping mechanism 14 holding the X stand 1 securely in place. There may be a clamping mechanism on each main rail. Once the X stand is set in place, the user must close the clamping mechanism to secure the X stand foot rail 2 to the dolly support beam. This procedure is duplicated on the opposite side support beam and thus secures the keyboard stand evenly in place on the dolly.

Figure 7:
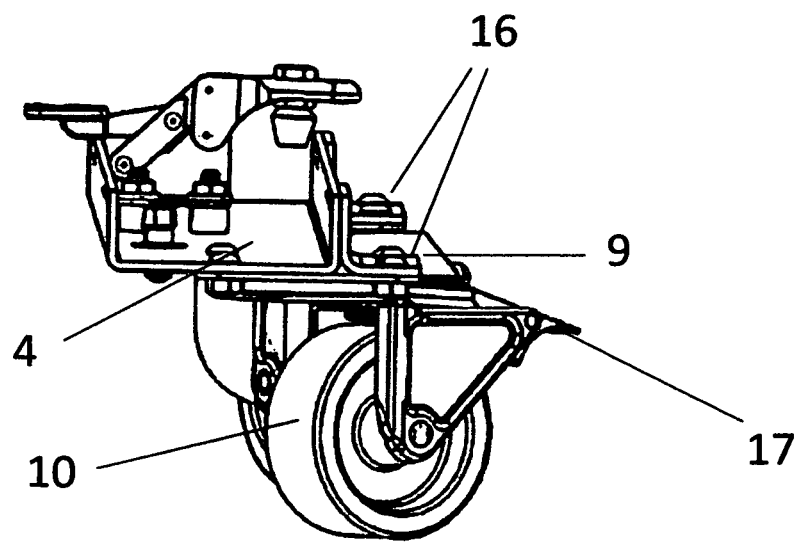
FIG. 7 is a drawing representing the end view of one support beam showing a wheel and wheel support bracket attached to said support beam.

FIG. 7 is a drawing representing one support beam 4 of the dolly from the end view. This view shows an embodiment including one flat surface (back) of the wheel support bracket 9 attached to a support beam and the other side of the wheel support bracket (bottom) is attached to a wheel 10. The bottom of each wheel support bracket may be attached to each wheel by means of a bolt and nut assembly 16 or other permanent application. This figure also shows one swiveling, locking, rubberized, heavy duty wheel 10 with the braking mechanism in the unlocked position 17.

Figure 8:
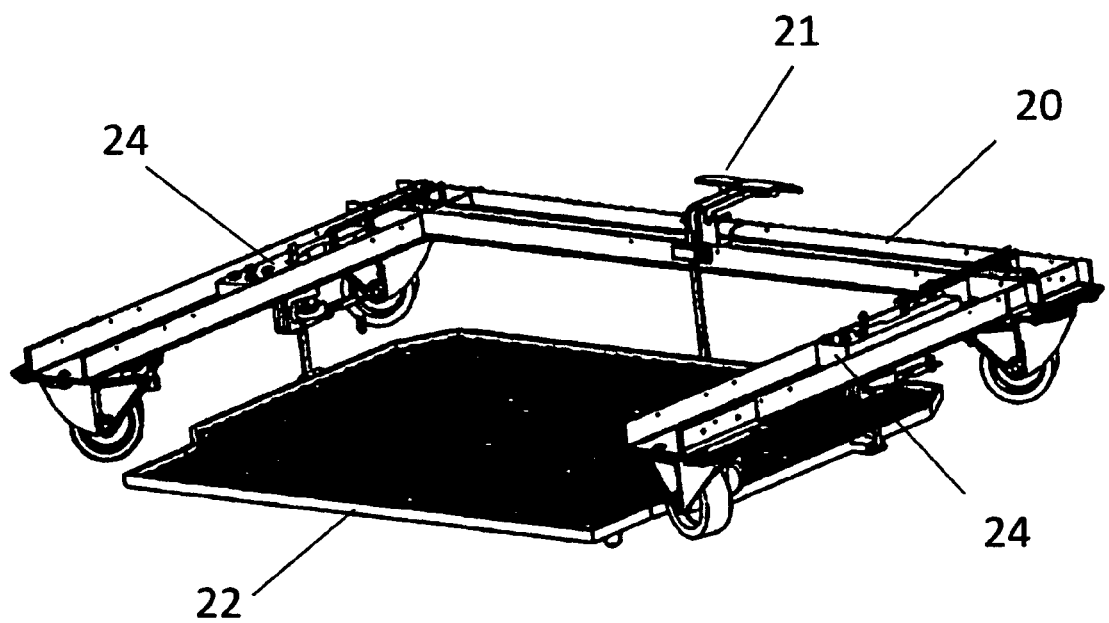
FIG. 8 is a drawing representing an angled front view of the X stand dolly main support beams configured with one link frame attached to the dolly support beams.

FIG. 8 is an embodiment of the X stand keyboard dolly configured to handle a load other than an X stand type keyboard stand. This configuration can be used for other types of loads including percussion items, guitar amps and bass amps. The load support deck 22 is coupled to an elevating mechanism, or lift block 24 that raises and lowers the load support deck as needed. There are two foot pedals 21 attached to the link frame 20 that control the raising and lowering of the load support deck 22.

Figure 9:
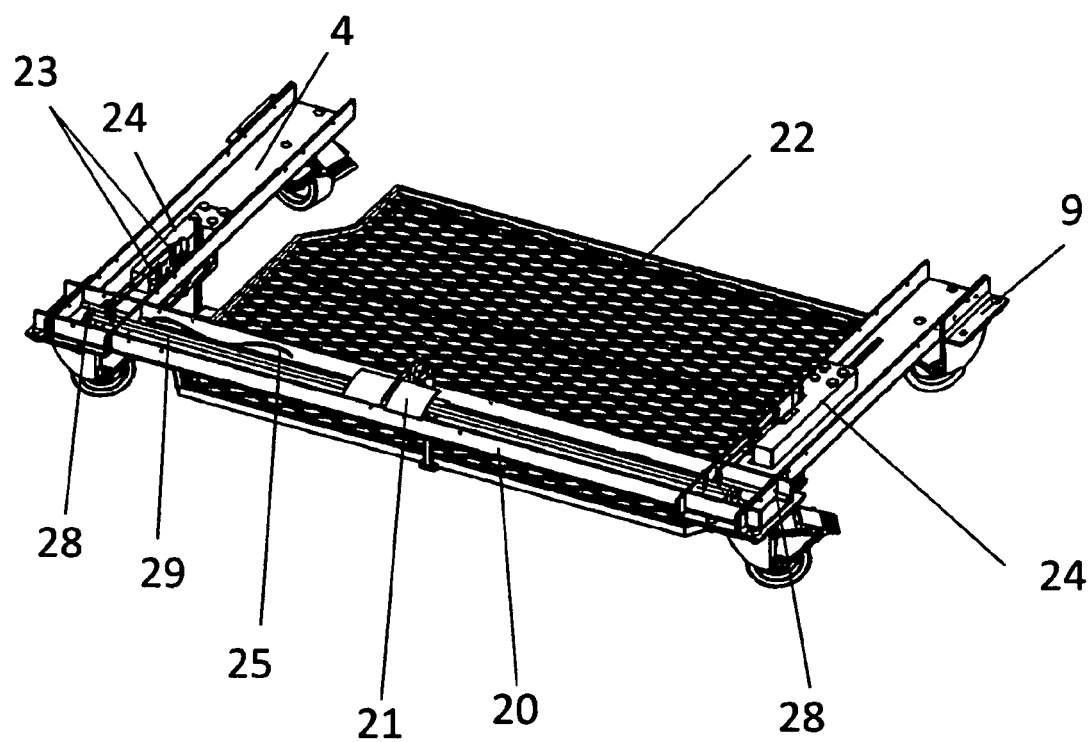
FIG. 9 is a front angled view of a dolly configured with a link frame and lifting mechanism.

FIG. 9 is a front angled view of the dolly with the load support deck 22 in the lowered position. The link frame 20 holds lift blocks 24 for lifting and lowering the load support deck 22. There is linkage 29 and bell cranks 23 to link the pedals 21 to the lift blocks 24. There is a link frame lock pin 28 and link frame lock pin retaining cable 25 attached to the link frame 20 to lock the link frame to the support beams.

Figure 10:
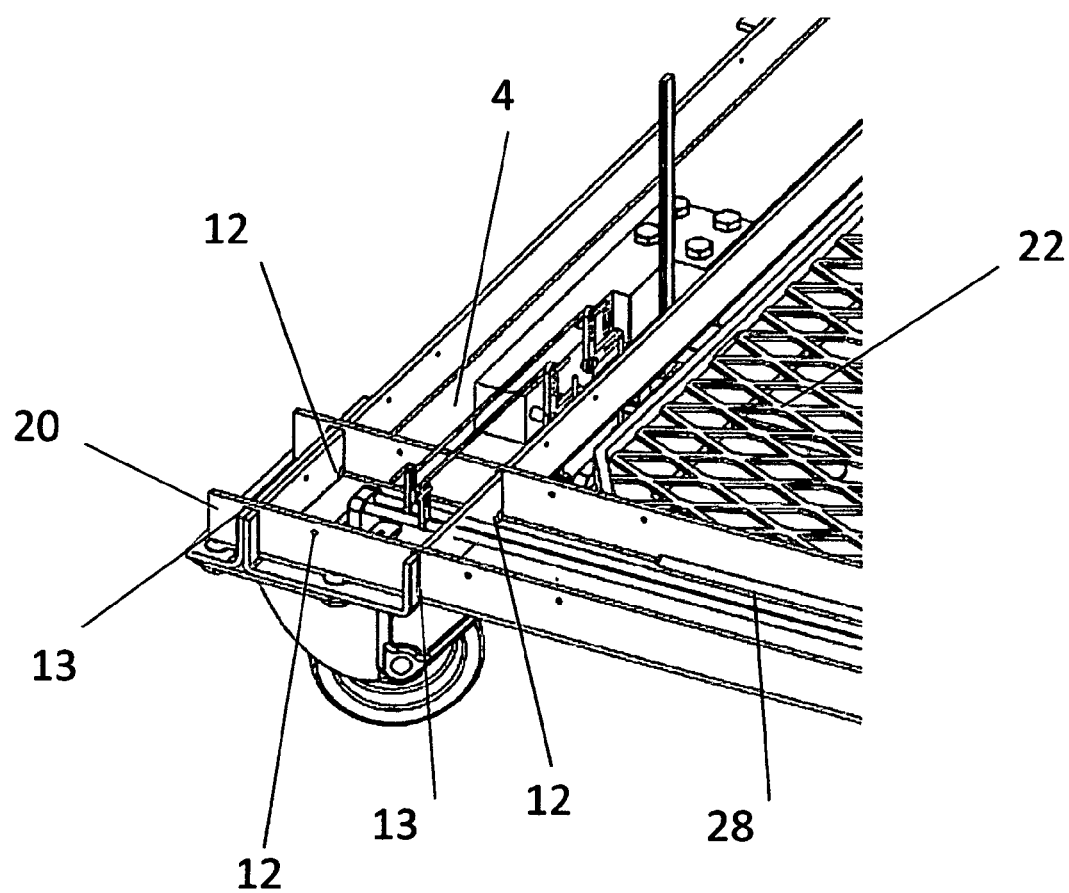
FIG. 10 is a close up front angled view of a link frame and lifting mechanism along with a link frame lock pin.

FIG. 10 is a close up front angled view of the dolly with the load support deck 22 in the raised position. There are notches 13 in the link frame 20 that allow the dolly support beam 4 to fit positively into the link frame 20. There are holes 12 that allow for the link frame lock pin 28 to slide into and lock the link frame and main support beam together. There are also holes 12 that allow for accessories to be fitted to the link frame and or dolly support beam as needed.

Figure 11:
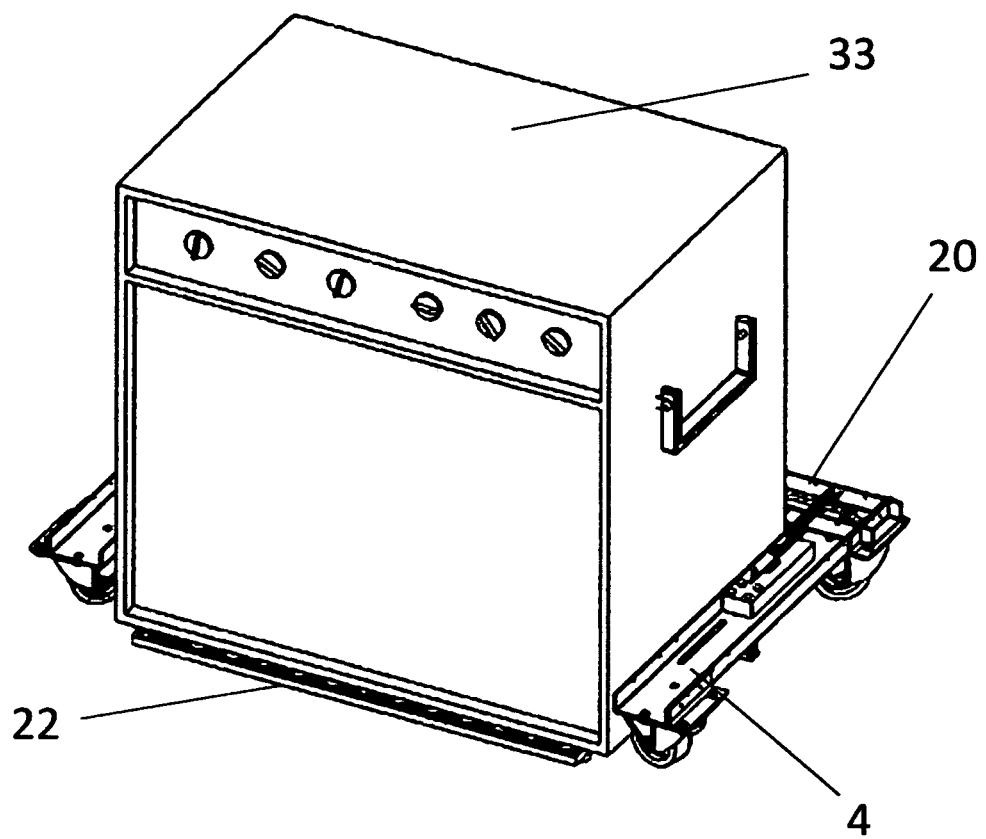
FIG. 11 is a front angle view of the dolly configured with a link frame and supporting a guitar amplifier.

FIG. 11 is a front angled view of a guitar amplifier 33 placed on a dolly that is configured to handle this kind of load. In this embodiment the load support deck 22 is in the lowered position. The dolly support beams 4 coupled to the link frame 20 and load support deck 22 form a sturdy dolly structure capable of supporting appropriate loads.

Figure 12:
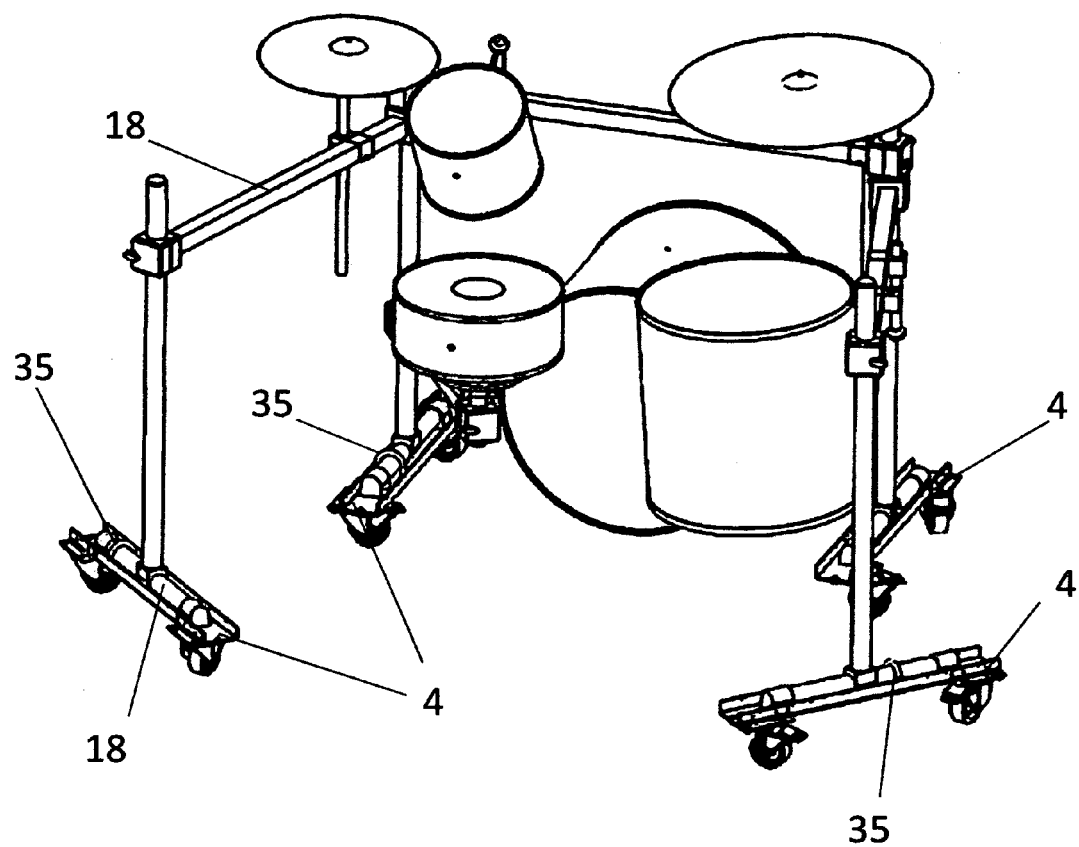
FIG. 12 is a rear angled view of the dolly configured with four dolly support beams and a drum rack as a load.

FIG. 12 is a rear angled view of a drum rack 18 being supported by the dolly main rails 4. There are J bolts 35 to hold the drum rack in place on the dolly main rails.

Figure 13:
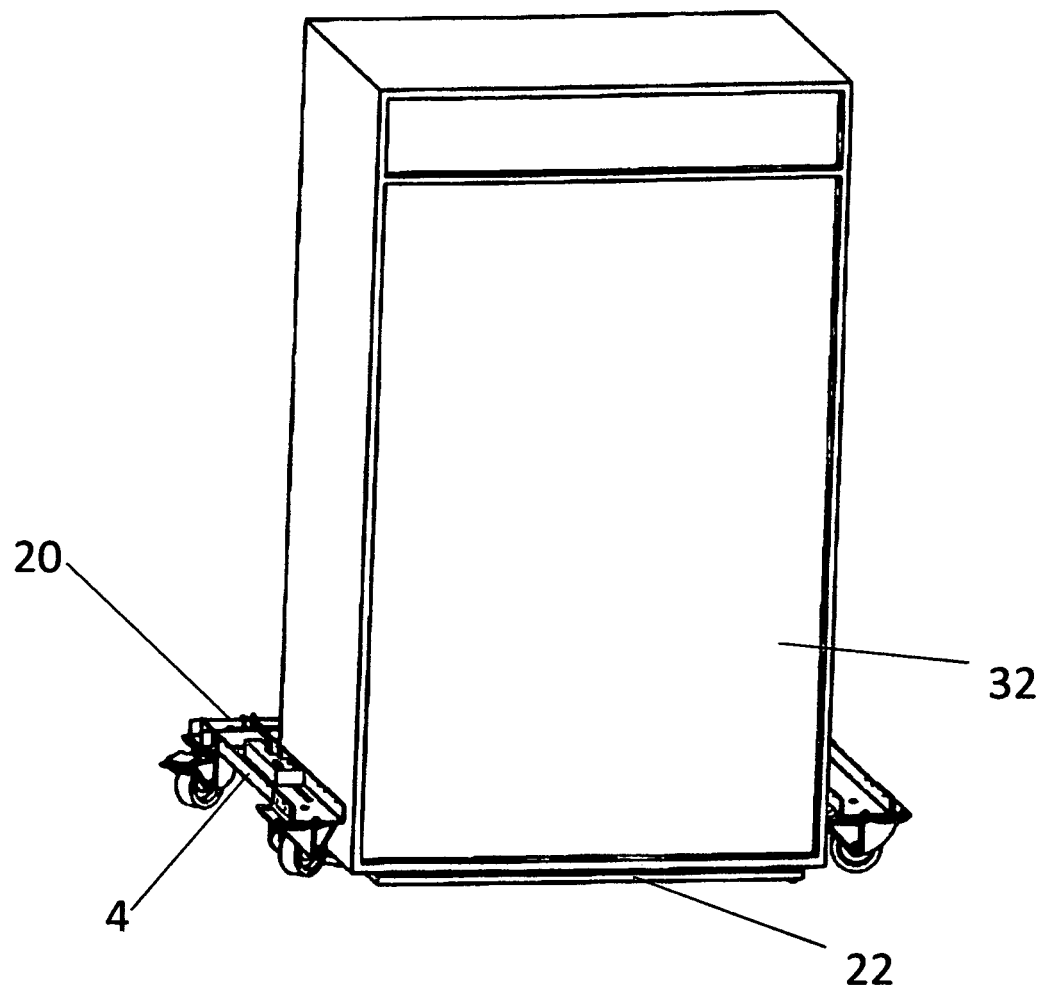
FIG. 13 is a front angled view of the dolly configured with a link frame and supporting a large speaker.

FIG. 13 is a front angled view of a large speaker 32 placed on a dolly that is configured to handle this kind of load. In this embodiment, the load support deck 22 is in the lowered position. The dolly support beams 4 coupled to the link frame 20 and load support deck 22 form a sturdy dolly structure capable of supporting this load.

Figure 14:
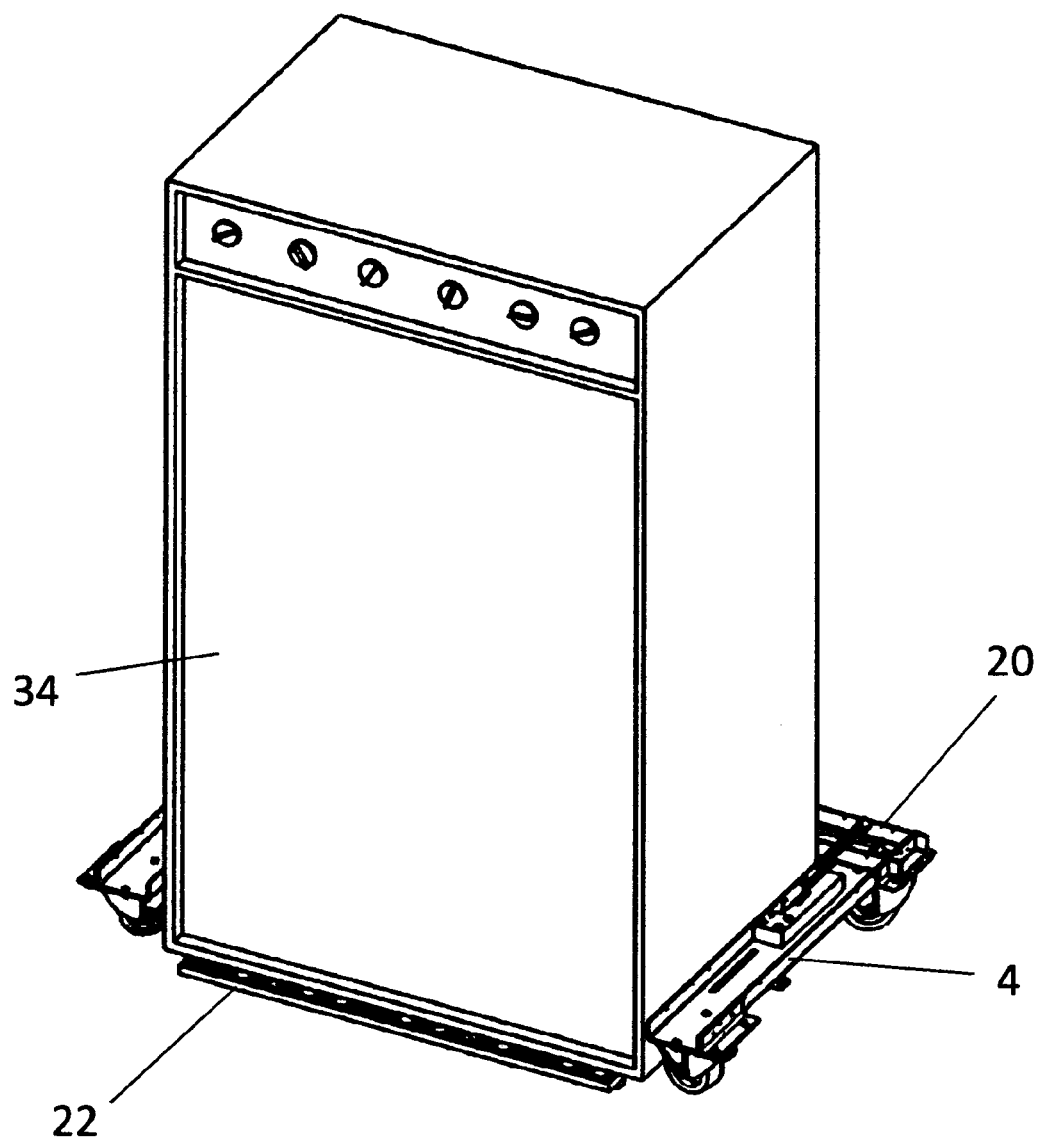
FIG. 14 is a front angled view of the dolly configured with a link frame and supporting a bass amplifier.

FIG. 14 is a front angled view of a bass amplifier 34 placed on a dolly that is configured to handle this kind of load. In this embodiment, the load support deck 22 is in the lowered position. The dolly support beams 4 coupled to the link frame 20 and load support deck 22 form a sturdy dolly structure capable of supporting this load.

Figure 15:
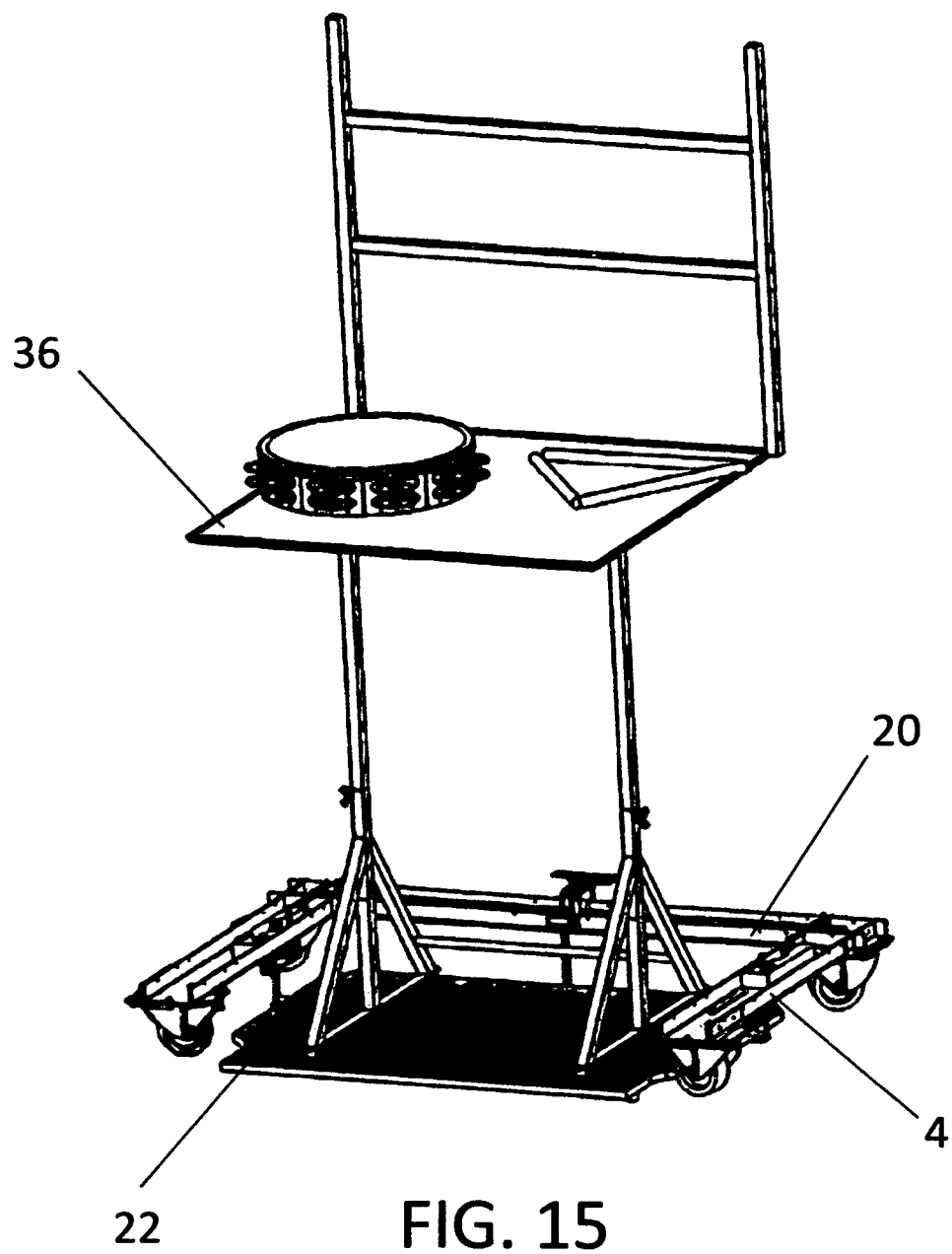
FIG. 15 is a front angled view of the dolly configured with a link frame and supporting a percussion table.

FIG. 15 is a front angled view of a percussion table 36 placed on a dolly that is configured to handle this kind of load. In this embodiment, the load support deck 22 is in the lowered position. The dolly support beams 4 coupled to the link frame 20 and load support deck 22 form a sturdy dolly structure capable of supporting this load.

Figure 16:
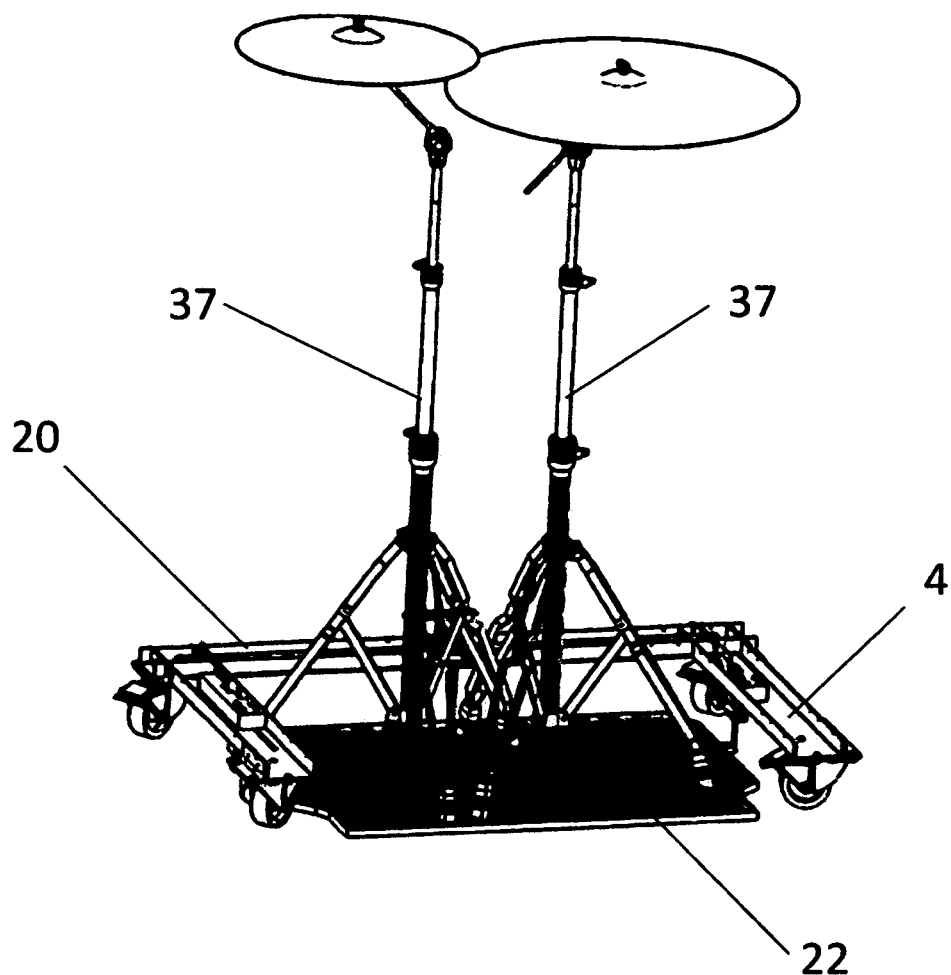
FIG. 16 is a front angled view of the dolly configured with a link frame and supporting two cymbal stands.

FIG. 16 is a front angled view of two cymbal stands 37 placed on a dolly that is configured to handle this kind of load. In this embodiment, the load support deck 22 is in the lowered position. The dolly support beams 4 coupled to the link frame 20 and load support deck 22 form a sturdy dolly structure capable of supporting this load.

Figure 17:
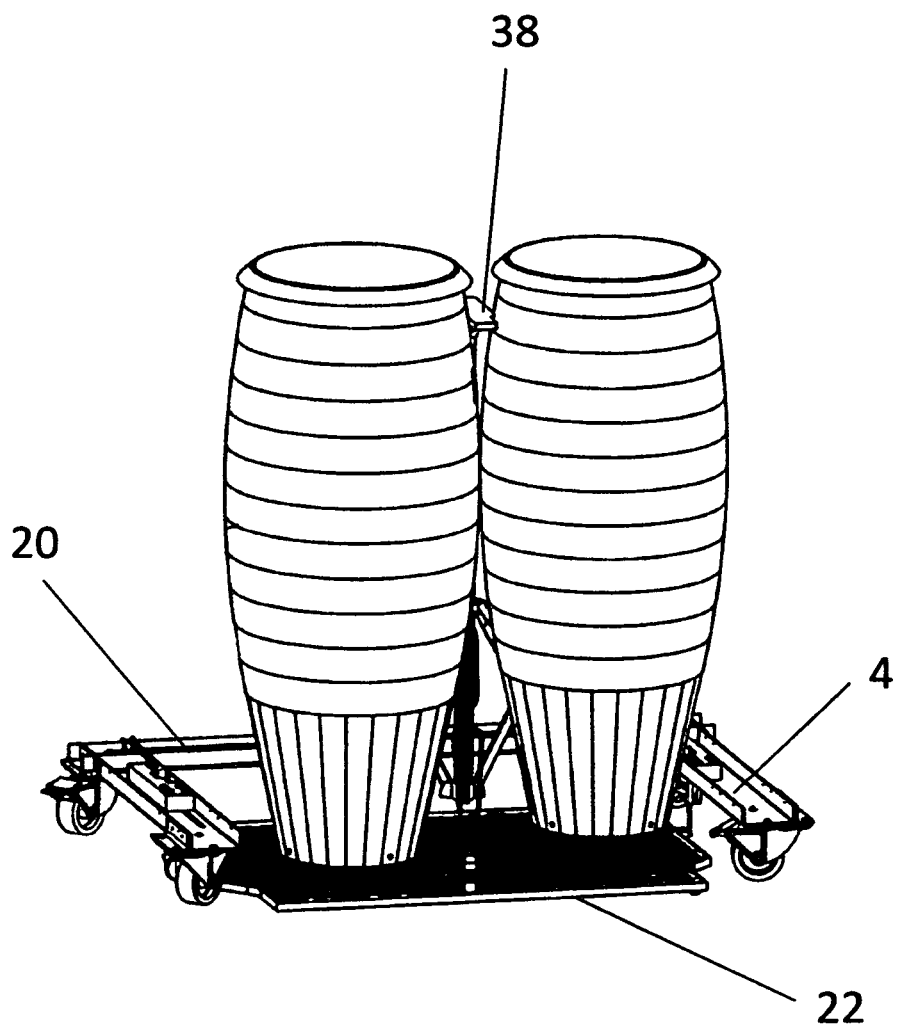
FIG. 17 is a front angled view of the dolly configured with a link frame and supporting a fully loaded conga stand.

FIG. 17 is a front angled view of a loaded conga stand 38 placed on a dolly that is configured to handle this kind of load. In this embodiment, the load support deck 22 is in the lowered position. The dolly support beams 4 coupled to the link frame 20 and load support deck 22 form a sturdy dolly structure capable of supporting this load.

REFERENCE NUMERALS

1. X stand keyboard stand
2. X stand keyboard stand foot rail
3. X stand keyboard dolly configuration
4. Dolly support beam
5. Adjustable beam section
6. Pivotable design for center brace
7. Telescoping design for center brace
8. Clinching mechanism
9. Wheel support brackets
10. Swiveling, locking, rubberized, heavy duty wheels
11. Slots
12. Holes
13. Notches
14. Clamping mechanism
15. Rivets
16. Bolt and nut assembly
17. Wheel braking lever—locked position
18. Drum Rack
19. Normal load (for X stand type keyboard stand)
20. Link frame
21. Foot pedal
22. Load support deck
23. Bell crank
24. Lift Block
25. Link Frame Lock Pin Retaining Cable
26. Spring counterweight
27. Lift rail
28. Link Frame Lock Pin
29. Linkage
30. Lift Lever
31. Release Lever 32. Large speaker
33. Guitar Amplifier
34. Bass Amplifier
35. J Bolt
36. Percussion Table
37. Cymbal Stand
38. Conga Stand

OPERATION

In operation one uses the complete keyboard setup in a normal manner including having the desired keyboards placed in position and the power cables, patch cables and all accessories attached. This is the normal load 19 for the keyboard stand 1 FIG. 1. When the X stand is utilized in conjunction with the X stand keyboard dolly 3 improvements increase the X stand's usability for the user:

1) An X stand type keyboard stand 1 when attached and used properly with an X stand keyboard dolly 3 has a newly added feature of mobility FIG. 1
2) This added feature is present because the dolly structure has attached a means of mobility such as wheels 10. FIG. 4.
3) These added wheels have a means of braking 17 to allow for secure lockdown of the dolly at a desired location. FIG. 4.
4) These added wheels have a means of un-braking allowing the user to quickly transition from a stationary mode to mobile mode. FIG. 7.
5) This dolly structure has a means of holding 14 an X stand type keyboard stand securely in place under load conditions. FIG. 6.
6) A means of adjusting 5 to align the dolly support beams and accommodate for the keyboard stand's many adjustment angles—while maintaining a level base FIG. 3.
7) A quick and easy move is facilitated allowing for better time management of the user—as the user would have to partially or totally disassemble the keyboard setup if the setup did not include an X stand keyboard dolly.
8) A user can be more creative in using the keyboard setup during a show, a teaching session, or other related situation.
9) A user can increase the safety of his or her gear—as the gear will have to be mounted and dismounted less often in order to help facilitate a move while using an X stand keyboard dolly.
10) A user can more efficiently utilize manpower as there is less physical effort involved to facilitate a move of the complete keyboard setup or other backline item while using an X stand keyboard dolly.
11) The dolly structure in this embodiment can separate into two smaller members, or otherwise shrink down to a minimal size for ease of transportation and storage. FIG. 4.

The invention claimed is:

1. A multi wheeled, stable, utility dolly for tasks including supporting and carrying a single or double tiered X stand type keyboard stand or other types of musical staging backline with or without accessories, comprising;
    a) a support beam having a length and a width for supporting material, and
    b) two wheels spaced apart mounted to freely swivel, and
    c) an extending beam pivotally coupled at one end to a side of said support beam for supporting material, and
    d) a clinching mechanism coupled at an opposing end of said extending beam, and
    e) at least one additional extending beam pivotally coupled at the opposing end of said extending beam forming a multi configurational center beam section for supporting material, and
    f) one additional support beam pivotally coupled to opposing end of said multi configurational center beam section, forming a complete stable dolly structure, and
    g) a clamping mechanism being removably coupled to said support beam, said clamping mechanism being repositionably coupled to said support beam along a generally vertical connecting member, for holding in place said single or double tiered X stand type keyboard stand or other loads against the support beam, and
    h) a braking mechanism coupled to at least one of said two wheels, and
    i) a lever as means to engage and release said braking mechanism.

2. The dolly in claim 1 whereby said support beam is a longitudinal u shape along a channel, comprising;
    a) a solid flat surface with a length and width and two adjacent flat structures of length and width together in rigid formation along a longitudinal axis to create a u shape channel or u channel extrusion, and
    b) said u shape channel is removably coupled to said extending beam, and
    c) said u shape channel and extending beam may be configured in many configurations.

3. The dolly of claim 1 where said clamping mechanism being removably coupled to the support beam is configured to hold a load in place, comprising;
    a) the clamping mechanism positioned to clamp closed to a closed limit configuration to a side or sides of the u shape support beam and unclamp open to an open limit configuration to a side or sides of the u shape support beam, and
    b) said clamping mechanism being configured to hold said single or double tier X stand type keyboard stand or other types of musical staging backline with or without accessories.

4. The dolly of claim 1 where said multi configurational center beams section further comprising;
    a) the clinching mechanism to hold the extending beam and additional extending beam of said multi configurational center beams section together in various configurations at the coupling of said extending beam and the clinching mechanism.

5. A method for holding and carrying a single or double tiered X stand type keyboard stand or musical staging backline or accessories on an adjustable utility dolly structure, comprising the steps of;
    a. providing said single or double tiered X stand type keyboard stand or other loads including musical staging backline or accessories and positioning them on said adjustable utility dolly structure, and
    b. providing a means of increasing effective footprint size of the multi configurational center beams section in a predetermined extended configuration and decreasing effective footprint size of the multi configurational center beams section in a predetermined retracted configuration by pivotally coupling a multi configurational center beams section between two u shape support beam sections enabling said dolly structure to change configurations to securely fit said single or double tiered X stand type keyboard stand or other loads including musical staging backline items or accessories on said multi configurational utility dolly structure at varying footprint sizes, and
    c. providing a clamping mechanism to hold said single or double tiered X stand type keyboard stand or other loads including musical staging backline items or accessories in place against said multi configurational utility dolly structure, and d. wherein said clamping mechanism is removably coupled to said support beam allowing said support beam to be used with or without said clamping mechanism, and e. wherein the clamping mechanism for said X stand or other load is repositionable along a generally vertical part and wherein said clamping mechanism may be positioned near said u shape support beam in a predetermined closed limit configuration, and positioned at a distance away from said u shape support beam in a predetermined open limit configuration, enabling adjustment capabilities of said clamping mechanism in relation to said u shape support beam, and f. providing a means of attaching accessories thereon said multi configurational utility dolly structure including holes or slots or notches to said multi configurational utility dolly structure, and g. providing wheels as means of mobility attached to said multi configurational utility dolly structure, and h. providing a means of applying and releasing a braking mechanism coupled to at least one said wheel of multi configurational utility dolly structure.

* * * * *